C. P. PHILLIPS.
Carriage-Spring.
No. 45,173.
Patented Nov. 22, 1864.
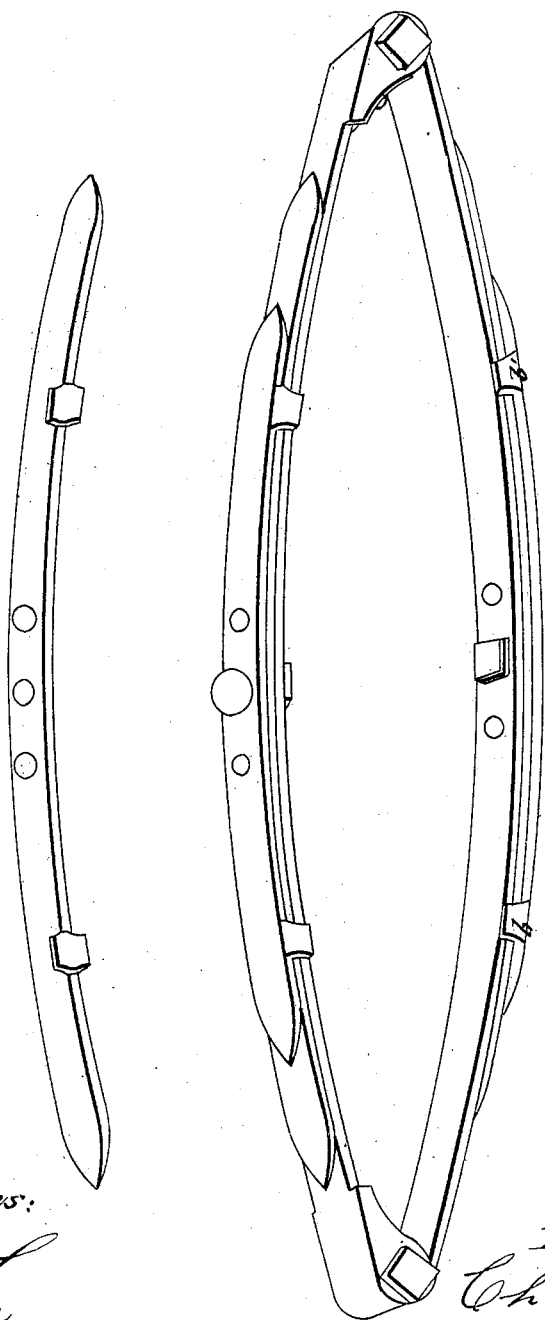
Witnesses:
M. S. Hubbery
Wm Wallace
Inventor:
Charles P Phillips

UNITED STATES PATENT OFFICE.

CHARLES P. PHILLIPS, OF SYRACUSE, NEW YORK.

IMPROVEMENT IN CARRIAGE-SPRINGS.

Specification forming part of Letters Patent No. 45,173, dated November 22, 1864.

*To all whom it may concern:*

Be it known that I, CHARLES P. PHILLIPS, of the city of Syracuse, county of Onondaga, and State of New York, have invented certain new and useful Improvements in Leaf Carriage-Springs; and I do hereby declare and ascertain the same, reference being had to the accompanying drawings, in which—

Figure 1 is a perspective view of an ordinary "elliptic spring" with my improvement added thereto, and which consists in forming outside guides near the extremities of one of the leaves of the spring, for the purpose of holding all of the leaves in place, by which means I am enabled to dispense with the slits and guides ordinarily used to keep the leaves of the spring in position, and which are found in practice to materially weaken the leaves of the spring and greatly increases the liability of breakage in the ordinary leaf-springs.

I have found by long experience in repairing leaf carriage-springs that they almost universally break at the point where the ordinary guide-slit is made in the leaf, and thus, seeing the necessity of a remedy for the evil, I have devoted much thought and experiment to the subject, and I find that by dispensing altogether with the ordinary slits and guides and holding the leaves of the spring all in position by outside guide-lugs, formed either on the outside or inside leaf, and projecting entirely across the edge of the spring, these outside guide-lugs may be formed on one of the center leaves, and projecting in both directions, so as to extend entirely across the edge of the spring. Although these outside guide-lugs might be formed on both edges of the leaf, I find it to be amply sufficient to form them on one edge only, as shown at $a\ a$ and $b\ b$, Fig. 1, because when so formed near the ends of the shortest leaf they act in conjunction with the ordinary center bolts which secure the spring to the axle and spring-bar, and while the guide-lug $a$ prevents the leaves at that end of the spring from moving in one direction, it also, by operating in conjunction with the center bolts, prevents the other ends of the leaves from moving in an opposite direction, and as the guide-lug $b$ operates in the same manner it will be seen that the two lugs $a$ and $b$, by operating singly and in conjunction with the center bolts, (by which the spring is attached,) operate to hold the leaves at each end of the spring in position in both directions, and thus one pair of guide-lugs for each half of the spring is amply sufficient to secure all of the leaves laterally in position, so as to preserve their perfect action and a neat and uniform position of their edges. I find that these outside guide-lugs can be welded onto one of the leaves with less labor and expense than the ordinary slits and guides can be formed, and that while they serve the purpose of keeping the leaves in perfect position they obviate the almost fatal objection to ordinary leaf-springs of frequent breaking and bending at the weak points formed by the ordinary method of holding the leaves in position.

Having thus fully described my invention, what I claim therein as new, and desire to secure by Letters Patent, is—

The outside guide-lugs, $a$ and $b$, so arranged as to operate in conjunction with the center bolts of leaf springs, for the purposes and in the manner specified.

CHARLES P. PHILLIPS.

Witnesses:
J. HUNT,
H. R. OLMSTED.